US006615790B2

(12) United States Patent
Andersson et al.

(10) Patent No.: US 6,615,790 B2
(45) Date of Patent: Sep. 9, 2003

(54) DEVICE THAT IMPROVES THE PERFORMANCE OF A PORTABLE ENGINE POWERED TOOL DURING WINTER CONDITIONS

(75) Inventors: Magnus Andersson, Jönköping (SE); Fredrik Ottosson, Jönköping (SE)

(73) Assignee: Aktiebolaget Electrolux, Stockholm (SE)

( * ) Notice: Subject to any disclaimer, the term of this patent is extended or adjusted under 35 U.S.C. 154(b) by 0 days.

(21) Appl. No.: 10/080,724

(22) Filed: Feb. 22, 2002

(65) Prior Publication Data

US 2002/0117127 A1 Aug. 29, 2002

(30) Foreign Application Priority Data

Feb. 28, 2001 (SE) ................................................ 0100680

(51) Int. Cl.[7] ............................... F02F 7/00; F02G 5/00
(52) U.S. Cl. .................................... 123/195 C; 123/556
(58) Field of Search ............................... 123/195 C, 556

(56) References Cited

U.S. PATENT DOCUMENTS 3,678,973 A * 7/1972 Loop ........................... 123/556
4,890,595 A * 1/1990 Fischer ........................ 123/556

* cited by examiner

Primary Examiner—Noah P. Kamen
(74) Attorney, Agent, or Firm—Pearne & Gordon LLP

(57) ABSTRACT

Engine-driven portable tools are widely used for different kinds of work where the surrounding conditions are very different. Large variations in temperature can cause problems for the engine, especially during low temperatures that occur during winter. The present invention reduces these problems in a simple and effective way by guiding heated air from the area adjacent to the muffler through a channel placed outside the casing to the air inlet for the engine. The cold air sucked into the engine is mixed with the heated air from the channel so that the temperature of the air mixture is increased.

9 Claims, 3 Drawing Sheets

DEVICE THAT IMPROVES THE PERFORMANCE OF A PORTABLE ENGINE POWERED TOOL DURING WINTER CONDITIONS

BACKGROUND OF THE INVENTION

The present invention relates to a device for improving the performance of a portable engine-powered tool during winter conditions.

Portable engine powered tools are widely used for different kinds of work. The environmental conditions to which the tools are exposed can therefore vary greatly depending upon the type of tool, the season, and the climate of the region where the tool is used. It is therefore not possible to make tools that will perform ideally in every possible environment. For example, chainsaws are used almost everywhere in the world, from rainforests to forests in the far north. The air temperature can vary between several degrees below zero in combination with snow and up to very high temperatures during summertime in sunshine.

The considerable variation in temperature is one parameter that heavily affects the performance of the engine. The greatest problems occur when the temperature is low. Another parameter of great importance to engine performance is the humidity of the air. The combination of low temperature and a high humidity is devastating for the tool. When such cold humid air passes over passages and nozzles in the engine, it causes a temperature drop in the air, which in turn causes the water in the air to condensate and freeze into ice that blocks the passages and nozzles.

Another problem during wintertime use is snow. Powdery snow in combination with the above-described parameters is especially a problem since the snow can get into the tool. Heavy snow may block the air inlet to the tool's engine, while lighter snow may be sucked into the air inlet with the air. Snow that has been sucked inside of the tool melts and then refreezes in the passages and nozzles causing them to be blocked.

Different approaches have been tried in order to find a solution to the above-described problems. One approach is to guide heated air from the engine's exhaust through a channel inside the casing of the tool to the air inlet to compensate for the low temperature air in the surrounding. However, this approach has some drawbacks. First of all is it difficult to create a channel that will work properly inside the narrow casing without increasing the size or the casing. Secondly, the channel must be repeatedly opened and closed depending upon the surrounding conditions. This could either be done by providing a complicated device on the outside of the casing or by opening the casing and activating or deactivating the channel inside the casing. The last alternative is not desirable due to the risk of dropping parts while the casing is open, especially if there is a lot of snow. There is also a risk that equipment inside the casing will be damaged. Both of these alternatives are consequently quite complicated and there is a need for a simpler solution to the above-described problems.

BRIEF SUMMARY OF THE INVENTION

The present invention solves the above-described problems by guiding heated air from the area around the muffler to the air inlet to the engine. This is done by first guiding the air through an opening in the casing and then through a channel placed on the outside of the casing. The channel ends before reaching the air inlet to the engine allowing the heated air to mix with the colder ambient air before being sucked into the engine. The temperature of the air mixture will then be high enough to prevent the water in the air from freezing in passages and nozzles inside the engine or the carburetor.

A channel placed on the outside of the casing has several advantages since it addresses the described problems in a simple way. The casing of the tool, such as a chainsaw, can be designed in a compact way, since the channel, or other arrangement for preheating the air for the engine, is not located inside the casing. If the chainsaw is used outside in winter conditions, the channel can be easily attached on the outside of the casing without risking damage or loss of components. The attached channel also serves to protect against snow getting into openings in the casing since the channel covers some of these openings. Another advantage of the present invention is that the area around the carburetor is also heated, which is favorable for the performance of the engine during winter conditions when the air temperature is low.

The channel is necessarily manufactured of a material that is strong and wear-resistant since the attached channel may be exposed to a lot of impact and wear. The weight of the channel is kept as low as possible in order to minimize the weight that must be carried by the operator. The channel may be secured to the casing by appropriate means depending upon the designs of the channel and the casing. One example is to secure the channel to the casing by using the same screws that secure different parts of the casing to each other. The channel could also be attached, for example, by providing the channel with hooks that can be attached to corresponding receiving means located on proper places on the casing. The above examples could be combined in order to further assist the operator in securing the channel to the casing.

The attachable channel on the outside of the casing of the present invention can also be designed to match older chainsaws already on the market which will make it possible to improve their performance during winter conditions.

BRIEF DESCRIPTION OF THE SEVERAL VIEWS OF THE DRAWING

FIG. 1 is a side view of a casing for a chain saw according to the present invention;

FIG. 2 is an elevational view of a shell for forming a channel according to the present invention;

FIG. 3 is a side view of the shell of FIG. 2; and

FIG. 4 is a view of the shell of FIGS. 2 and 3 secured to the casing of FIG. 1.

DETAILED DESCRIPTION OF THE INVENTION

Figure 1:
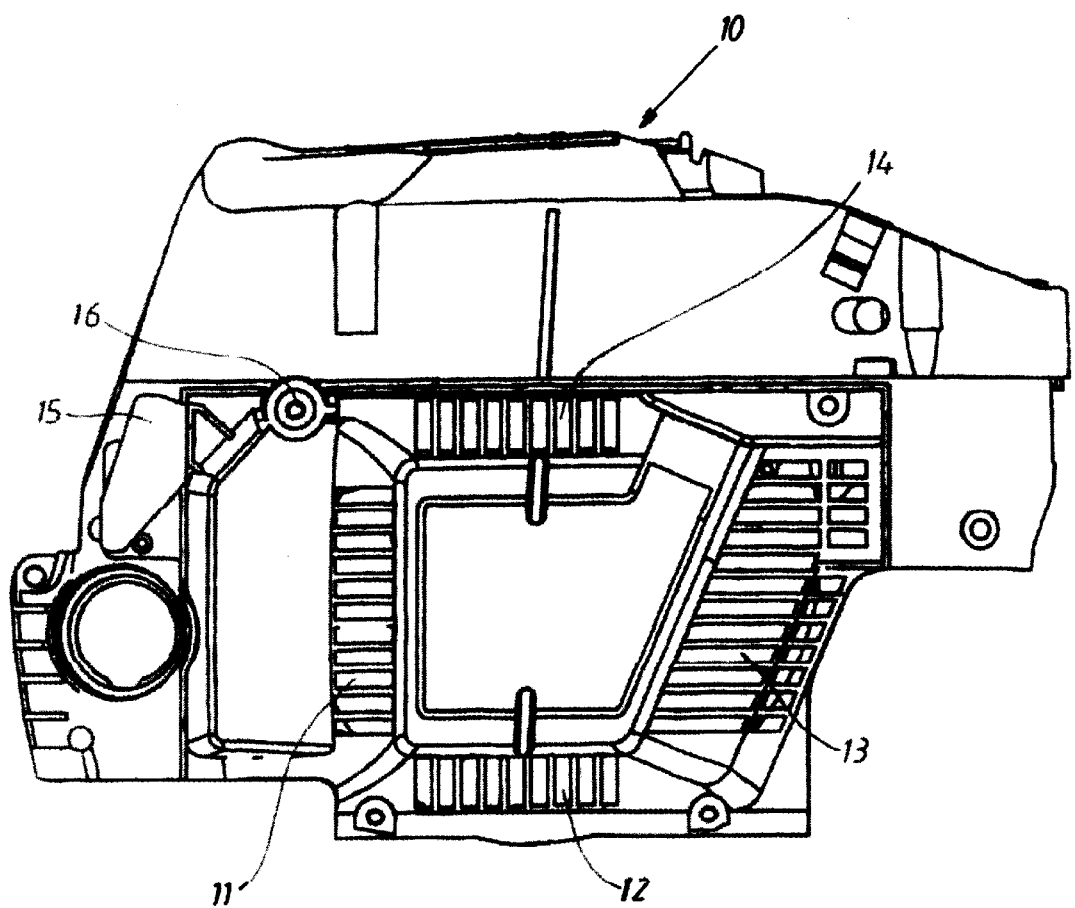
FIGS. 1–4 illustrate an embodiment of the present invention designed for use in combination with a chain saw.

FIG. 1 illustrates a casing 10 used for a chainsaw (not shown). The casing 10 has four different air inlets 11, 12, 13 and 14 on the side of the casing 10 to provide the engine (not shown) of the chainsaw with air. There is also an opening 15 in the casing 10 adjacent to a muffler (not shown) for the engine placed inside the casing 10.

Figure 2:
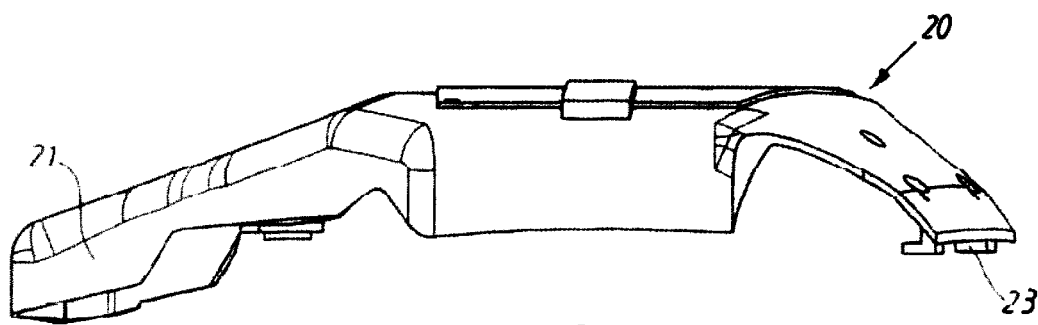
Figure 3:
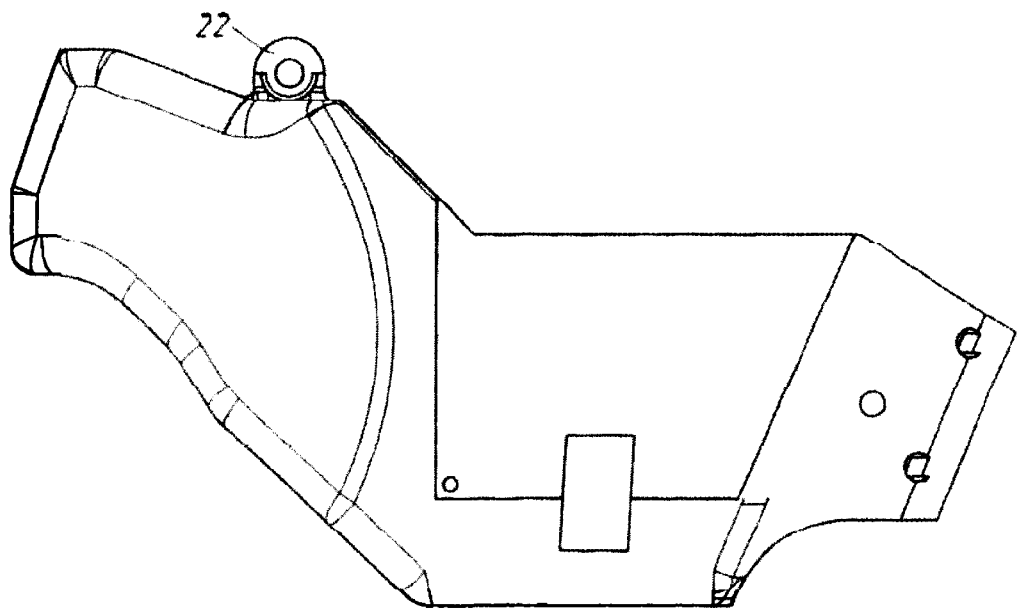

FIGS. 2 and 3 illustrate a shell 20 used for chainsaws. The shell 20 has a U-shaped section 21. The edges of the U-shaped section 21 are in contact with the casing 10 of the chainsaw so that it creates a channel between the shell 20 and the casing 10 of the chainsaw. The shell 20 can alternatively be shaped like a pipe to create the channel instead of using the casing 10 as a part of the channel. The cross section of the channel is big enough to let the warm air pass easily. The shell 20 is provided with a hole 22 for securing the shell 20 to the casing 10 with a screw. The shell 20 is also provided with a couple of hooks 23 for securing the shell 20 to the casing 10 of the chainsaw.

The shell 20 is attached to the casing 10 by placing the hooks 23 between two halves of the casing 10. When the hooks 23 are positioned correctly, the shell 20 is secured to the casing 10 by a screw passing through the hole 22 on the shell 20 and then fastened into a fastening point 16 of the casing 10.

Alternatively, the securing of the shell 20 to the casing could be done by one or more different means. The shell 20 could be fastened to the casing 10 by the same screws that keep the different parts of the casing 10 in the right position as an alternative to being secured by screws provided just for the shell 20. In order to reduce the number of screws, is it convenient to provide hooks 23 to the shell 20 that can be secured either between the different parts of the casing 10 or into corresponding fastening devices.

Figure 4:
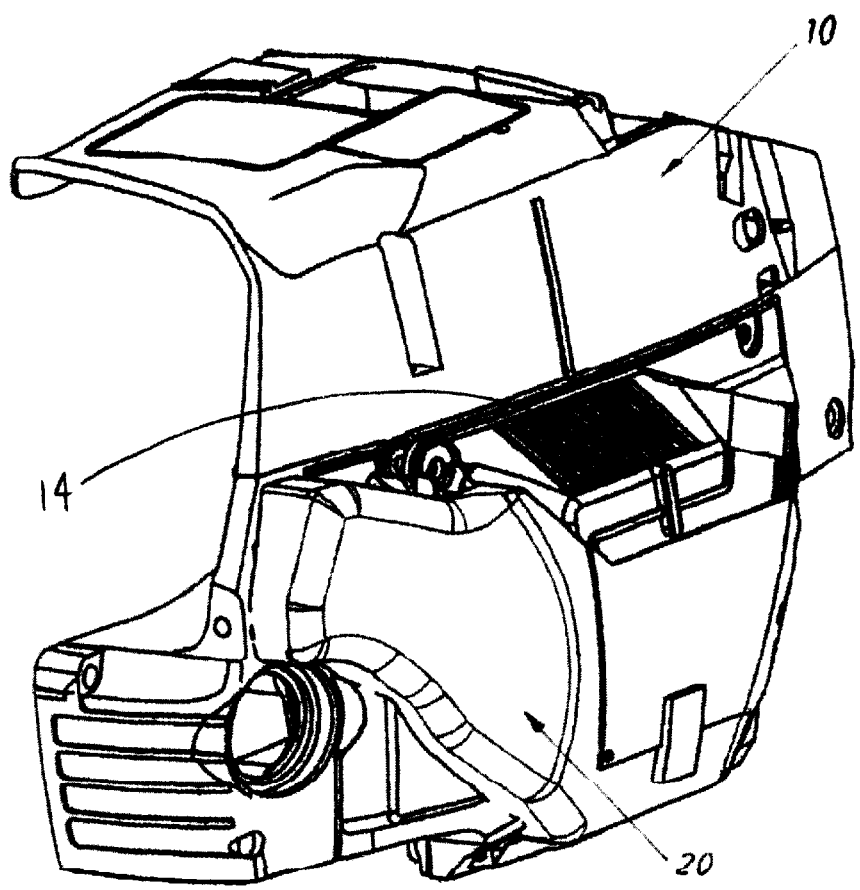

FIG. 4 illustrates the shell 20 attached to the casing 10 so that a channel is created between the opening 15 adjacent to the muffler and the air inlets 11 and 12. Heated air is thereby led from the area around the muffler to the inlets 11 and 12 where the heated air is sucked into the engine. The inlet 14 not covered by the shell 20 suck in cold air from the surrounding and it is thereby possible to control the mixture of heated and cold air supplied to the engine by affecting the design of the shell 20.

The channel could be arranged in different ways between the opening 15 and the inlets 11, 12, 13, 14 along the surface of the casing 10 in order to optimize the weight distribution and the shape of the chainsaw, and also to minimize the amount of wear on the shell 20. One part 21 of the shell 20 covers the opening 15 in the casing 10. The heated air is then led through the created channel between the shell 20 and the surface of the casing 10.

The design of the shell 20, according to the illustrated embodiment, results in the shell 20 covering the inlets 11, 12 and 13. This is an advantage since snow easily can pass into these lower inlets 11, 12 and 13 during use or when the chainsaw is put down in the snow, for example during a break.

The shell 20 can be manufactured in different shapes from an appropriate a material that meets the demands of a particular application. The position of the shell 20 on the outside of the casing 10 exposes it to a lot of impact and wear. In the present embodiment, the shell 20 is therefore made of aluminum or a strong plastic material.

What is claimed is:

1. A combustion engine-driven portable tool comprising:
   a detachable channel outside the tool through which heated air from an area adjacent a muffler of the engine is led to an air inlet to the engine;
   a casing surrounding the combustion engine; and
   a shell attached to the casing so that the channel is created between the shell and the casing.

2. A tool according to claim 1, wherein the shell (20) is secured to the casing (10) by screws that keep different parts of the casing (10) in place.

3. A tool according to claim 1, wherein the shell (20) is secured at fastening points on the surface of the casing (10).

4. A tool according to claim 1, wherein a first end of the channel is connected to the air inlet to the engine and a second end of the channel is connected to an opening (15) in the casing (10) adjacent to the muffler.

5. A tool according to claim 4, wherein the first end of the channel is shaped to only cover part of the air inlet (11, 12, 13, 14).

6. A tool according to claim 4, wherein the second end of the channel is shaped to only partially covers the opening (15).

7. A tool according to claim 1, wherein the shell (20) is shaped to prevent snow from entering one of the air inlet (11, 12, 13, 14) and the opening (15) in the casing (10).

8. A tool according to claim 1, wherein the shell (20) is manufactured of a material that is resistant to wear, impact and high temperature.

9. A tool according to claim 8, wherein the material comprises one of aluminum and a plastic material.

* * * * *